(12) United States Patent
Yoshida et al.

(10) Patent No.: US 7,290,890 B2
(45) Date of Patent: Nov. 6, 2007

(54) RETRACTING MECHANISM OF VEHICULAR OUTER MIRROR DEVICE

(75) Inventors: Shigeki Yoshida, Aichi-ken (JP); Yoshio Tsujiuchi, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 11/220,412

(22) Filed: Sep. 7, 2005

(65) Prior Publication Data

US 2006/0050418 A1 Mar. 9, 2006

(30) Foreign Application Priority Data

Sep. 8, 2004 (JP) .............................. 2004-261622

(51) Int. Cl.
*G02B 5/08* (2006.01)
*G02B 7/182* (2006.01)
*B60R 1/06* (2006.01)

(52) U.S. Cl. ........................................ 359/841; 359/877
(58) Field of Classification Search ................ 359/841, 359/872, 877
See application file for complete search history.

(56) References Cited

U.S. PATENT DOCUMENTS

| | | | | |
|---|---|---|---|---|
| 4,626,084 A | * | 12/1986 | Kumai .................... | 359/841 |
| 4,786,156 A | * | 11/1988 | Kotani et al. ............. | 359/872 |
| 5,012,693 A | * | 5/1991 | Enomoto et al. ........... | 74/502.1 |
| 5,369,530 A | * | 11/1994 | Yamauchi et al. .......... | 359/874 |
| 5,579,178 A | * | 11/1996 | Mochizuki ................ | 359/841 |
| 5,781,354 A | * | 7/1998 | Sakata ................... | 359/841 |
| 6,793,358 B2 | * | 9/2004 | Sakata ................... | 359/872 |
| 6,811,270 B2 | * | 11/2004 | Yoshida .................. | 359/841 |
| 6,871,969 B2 | * | 3/2005 | Yamauchi et al. .......... | 359/841 |
| 6,874,896 B2 | * | 4/2005 | Yoshida .................. | 359/841 |
| 6,923,547 B2 | * | 8/2005 | Yoshida et al. ........... | 359/841 |
| 6,979,091 B2 | * | 12/2005 | Ichikawa ................ | 359/872 |
| 7,104,660 B2 | * | 9/2006 | Sakata et al. ............ | 359/841 |
| 2003/0086188 A1 | | 5/2003 | Hayashi | |
| 2004/0109248 A1 | | 6/2004 | Yoshida et al. | |

FOREIGN PATENT DOCUMENTS

| | | |
|---|---|---|
| JP | 5-16491 | 3/1993 |
| JP | 5-58484 | 8/1993 |
| JP | 5-58485 | 8/1993 |
| JP | 5-58486 | 8/1993 |
| JP | 2001-277943 | 10/2001 |
| JP | 2002-67805 | 3/2002 |
| JP | 2004-26045 | 1/2004 |

* cited by examiner

*Primary Examiner*—Ricky D. Shafer
(74) *Attorney, Agent, or Firm*—Roberts, Mlotkowski & Hobbes; Thomas W. Cole

(57) ABSTRACT

A retracting mechanism for storing or erecting a mirror includes, at a coupled portion of an output shaft of a drive motor and a worm gear, coupling retaining portions fitted together in a press-fitted state and rotational force transmitting portions opposing each other in a state where a predetermined gap is present between them. The coupling retaining portions are configured by a circular shaft portion and a circular fitting hole, and the rotational force transmitting portions are configured by a double D-cut portion and double D-protruding portions. The rotational force of the output shaft is transmitted by the rotational force transmitting portions, and the coupled state of the output shaft and the worm gear is retained on the same axial line and the slanting of the worm gear is prevented by the coupling retaining portions.

14 Claims, 5 Drawing Sheets

RETRACTING MECHANISM OF VEHICULAR OUTER MIRROR DEVICE

CROSS-REFERENCE TO RELATED APPLICATION

This application claims priority under 35 USC 119 from Japanese Patent Application No. 2004-261622, the disclosure of which is incorporated by reference herein.

BACKGROUND OF THE INVENTION

1. Field of the Invention

The present invention relates to a retracting mechanism of a vehicular outer mirror device disposed in a vehicle.

2. Description of the Related Art

There is a vehicular door mirror device disposed with a retracting mechanism (e.g., see Japanese Patent Application Publication (JP-A) No. 2002-67805).

This type of retracting mechanism includes a support shaft fixed to a vehicle body, and a case member is pivotably supported on the support shaft. A rearview mirror is coupled to the case member, and the case member is always pivoted integrally with the mirror.

A gear plate formed as a helical gear is disposed on the support shaft inside the case member in a state where the rotation of the gear plate is prevented (deterred). A motor is fixed inside the case member, and a motor gear such as a worm gear is coupled to the output shaft of the motor. Intermediate gears such as twin gear comprising a worm gear and a helical gear are disposed inside the case member. The gears mesh with the motor gear of the motor output shaft and the gear plate, so that the motor gear and the gear plate are coupled together. Thus, when the motor is driven, the intermediate gears rotate while meshing the periphery of the gear plate. Thus, the case member is pivoted around the support shaft, and the mirror is stored or erected.

At the coupled portion of the output shaft of the motor and the motor gear, the end portion of the motor output shaft is formed in a double D-cut, where two sites opposing each other in the circumferential direction are chamfered in planar shapes, in order to transmit the rotational force of the motor to the motor gear. Thus, the output shaft of the motor and the motor gear are coupled together, and the rotational force of the motor is transmitted to the motor gear (e.g., see Japanese Utility Model Application Publication No. 5-58484).

However, when the motor is driven, a reaction force from the gear plate and the intermediate gears acts on the motor gear, and the motor gear tries to slant. Namely, at the coupled portion of the output shaft of the motor and the motor gear, a reaction force alternately acts on the D-cut surface and the circumferential surface other than the D-cut portion, and the motor gear repeatedly slants (wobbles) and does not slant (does not wobble) at a 90° pitch in accompaniment with the rotation of the output shaft of the motor. As a result, abnormal noises occur.

SUMMARY OF THE INVENTION

In consideration of these circumstances, the present invention provides a retracting mechanism of a vehicular outer mirror device that can stably couple the output shaft of the motor and the motor gear together and prevent the occurrence of abnormal noises.

A retracting mechanism of a vehicular outer mirror device of a first aspect of the invention comprises: a case member that is pivotably supported on a support shaft of a vehicle body and to which a vehicular outer mirror is coupled; a motor disposed in the case member; a motor gear that is disposed in the case member, is coupled to an output shaft of the motor, and is rotated by the driving of the motor; a gear plate attached to the support shaft such that its rotation with respect to the support shaft can be prevented; and intermediate gears that are disposed in the case member and mesh with the motor gear and the gear plate to couple the motor gear and the gear plate together, with the intermediate gears rotating while meshing the periphery of the gear plate in a state where the rotation of the gear plate with respect to the support shaft is prevented (deterred), whereby the outer mirror is pivoted together with the case member around the support shaft, wherein the coupled portion of the output shaft of the motor and the motor gear includes coupling retaining portions that are fitted together in a press-fitted state, retain the coupled state of the output shaft of the motor and the motor gear on the same axial line, and deter the slanting of the motor gear, and rotational force transmitting portions that oppose each other in a state where a predetermined gap is present between them and transmit only the rotational force of the motor to the motor gear.

It is preferable for the coupling retaining portions to be configured by a circular shaft portion that is disposed on the output shaft of the motor and is formed in a cross-sectionally circular shape and by a circular fitting hole that is formed in the motor gear so as to fit together with the circular shaft portion. Also, it is preferable for the rotational force transmitting portions to be configured by a double D-cut portion that is disposed on the output shaft of the motor and formed as the result of two sites that oppose each other in the circumferential direction being chamfered in planar shapes and by double D-protruding portions that are formed in the motor gear in correspondence to the double D-cut portion.

In the retracting mechanism of a vehicular outer mirror device of the first aspect of the invention, when the motor is driven in a state where the rotation of the gear plate with respect to the support shaft is prevented, the intermediate gears rotate while meshing the periphery of the gear plate. Thus, the case member is pivoted around the support shaft, and the outer mirror is stored or erected.

Here, the coupling retaining portions mutually fitted together in a press-fitted state and the rotational force transmitting portions opposing each other in a state where a predetermined gap is present between them are disposed at the coupled portion of the output shaft of the motor and the motor gear. The rotational force of the motor output shaft is transmitted by the rotational force transmitting portions, and the coupled state of the output shaft and the motor gear is retained on the same axial line and the slanting of the motor gear is prevented by the coupling retaining portions.

Namely, the coupled portion of the output shaft of the motor and the motor gear is configured to not just simply transmit the rotational force but also retain the coupled state of the output shaft and the motor gear. Moreover, the rotational force transmitting portions function to transmit the rotational force, and the coupling retaining portions function to retain the coupled state of the output shaft and the motor gear. In this manner, the respective functions are divided between independent separate sites.

For this reason, the output shaft of the motor and the motor gear can be stably coupled together, and even if the reaction force from the gear plate and the intermediate gears acts on the motor gear and the motor gear tries to slant—i.e., even if the reaction force alternately acts on the D-cut surface and the circumferential surface other than at the D-cut portion as has conventionally been the case—the motor gear does not repeatedly slant (wobble) and not slant (not wobble) at a 90° pitch in accompaniment with the rotation of the output shaft of the motor. As a result, the occurrence of abnormal noises can be prevented.

A retracting mechanism of a vehicular outer mirror device of a second aspect of the invention comprises: a support shaft fixed to a vehicle body; a case member that is pivotably supported on the support shaft and retains a vehicular outer mirror; a motor disposed in the case member; a motor gear that is disposed in the case member, is coupled to an output shaft of the motor, and is rotated by the driving of the motor; and a rotation transmitting mechanism that transmits the rotation of the motor gear to the support shaft to thereby cause the case member to rotate around the support shaft, wherein in the portion where the output shaft of the motor and the motor gear are coupled together, there are formed coupling retaining portions where the output shaft and the motor gear are fitted together and which retain their axial centers on the same axial line, and rotational force transmitting portions where the output shaft and the motor gear include mutually opposing planar surfaces and where the rotational force is transmitted between the output shaft and the motor gear via the planar surfaces.

A retracting mechanism of a vehicular outer mirror device of a third aspect of the invention comprises: a support shaft fixed to a vehicle body; a case member that is pivotably supported on the support shaft and retains a vehicular outer mirror; a motor disposed in the case member; a motor gear that is disposed in the case member, is coupled to an output shaft of the motor, and is rotated by the driving of the motor; and a rotation transmitting mechanism that transmits the rotation of the motor gear to the support shaft to thereby cause the case member to rotate around the support shaft, wherein in the portion where the output shaft of the motor and the motor gear are coupled together, there are formed coupling retaining portions where the output shaft and the motor gear are fitted together and which retain their axial centers on the same axial line, and rotational force transmitting portions where the output shaft and the motor gear include surfaces that oppose each other in a state where they include a predetermined gap and where the rotational force is transmitted between the output shaft and the motor gear via the surfaces.

As described above, the retracting mechanism of a vehicular outer mirror device of the present invention has excellent effects in that it can stably couple the output shaft of the motor and the motor gear together and prevent the occurrence of abnormal noises.

DETAILED DESCRIPTION OF THE INVENTION

Figure 6:
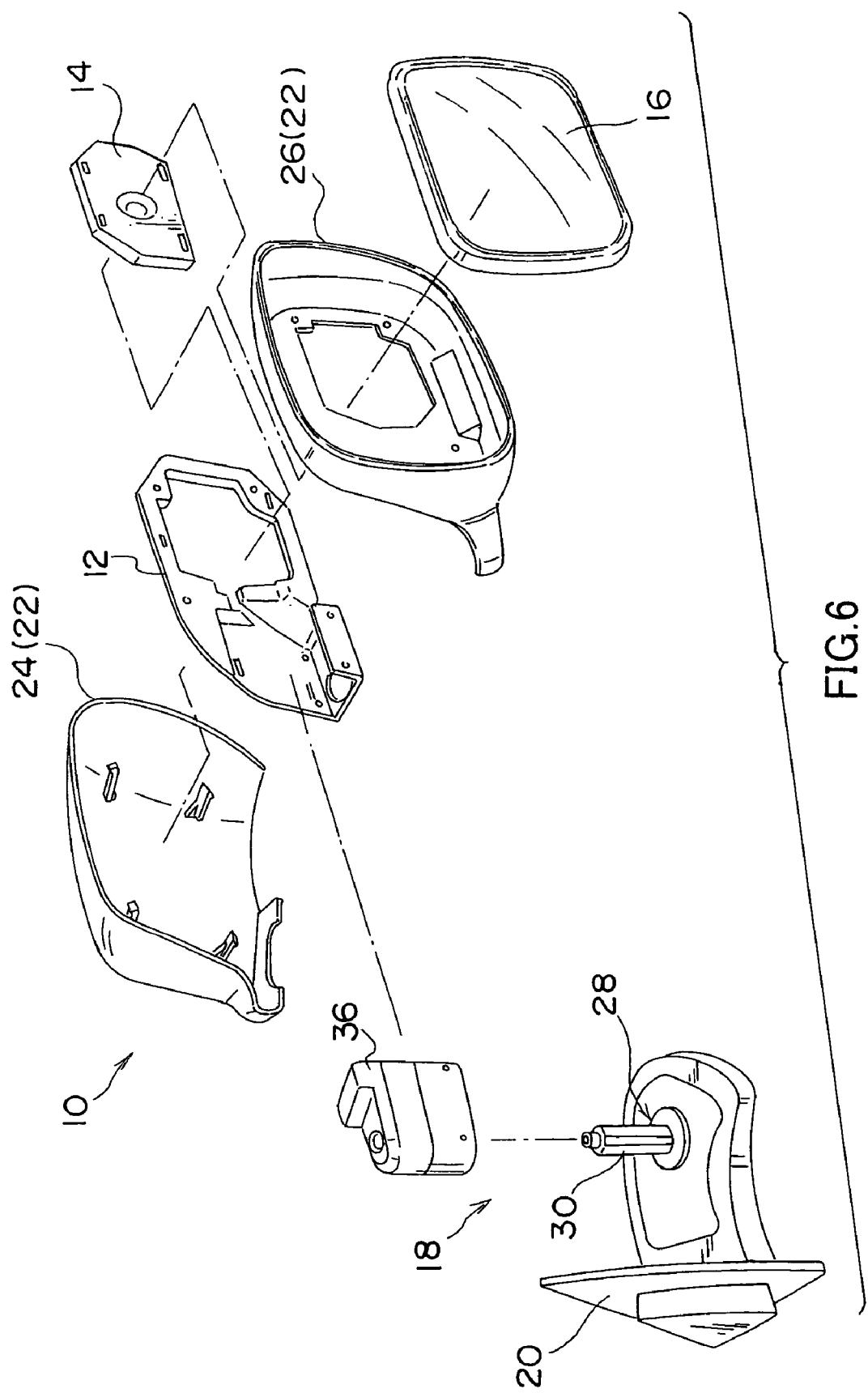
FIG. 6 is an exploded perspective view showing the overall configuration of a vehicular outer mirror device to which the retracting mechanism pertaining to the embodiment of the invention has been applied.

The overall configuration of a vehicular outer mirror device 10 to which a retracting mechanism 18 pertaining to an embodiment of the invention has been applied is shown in exploded perspective view in FIG. 6.

The vehicular outer mirror device 10 is formed as a door mirror device and includes a frame 12. A retaining member 14 is fixed to the frame 12, and a rearview mirror 16 is retained on the retaining member 14. The frame 12 is fixed to the retracting mechanism 18, which will be described in detail later. The retracting mechanism 18 is attached to a door mirror stay 20 that is fixed to a door (not shown) of a vehicle. Thus, the retracting mechanism 18 supports the mirror 16 via the frame 12 and the retaining member 14. The retracting mechanism 18 is a mechanism positioned in a deployed position, where it pivots the mirror 16 and is erect with respect to the door of the vehicle, and a stored position, where it is folded substantially along the door.

The frame 12, the retaining member 14 and the retracting mechanism 18 are housed in a door mirror visor 22. The door mirror visor 22 is configured by a vehicle front-side visor cover 24 and a vehicle rear-side visor rim 26 that are joined together. The visor cover 24 and the visor rim 26 are both fixed to the frame 12.

Figure 1:
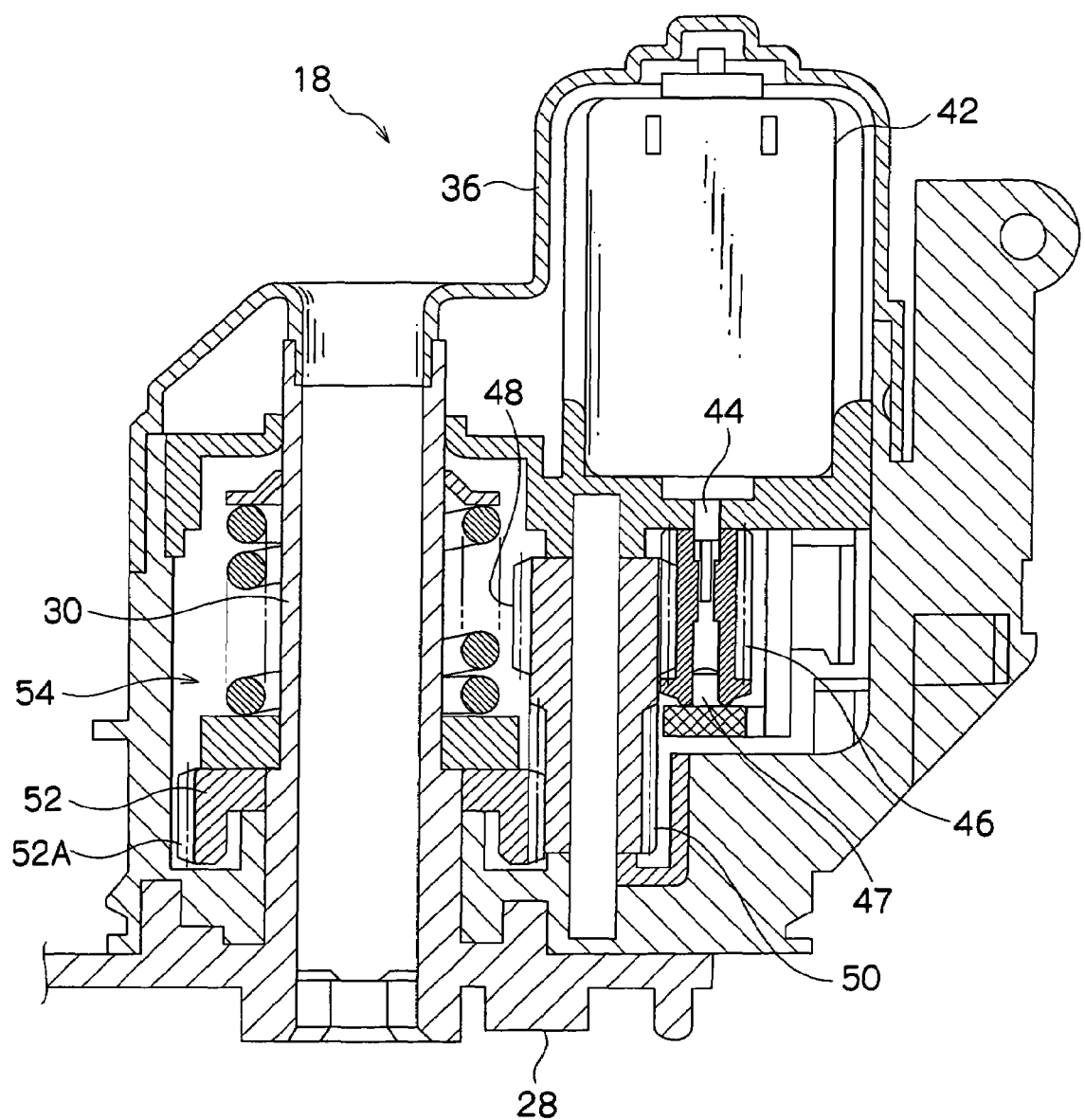
FIG. 1 is a cross-sectional view showing the overall configuration of a retracting mechanism pertaining to an embodiment of the invention.

Here, the overall configuration of the retracting mechanism 18 is shown in cross-sectional view in FIG. 1.

The retracting mechanism 18 includes a stand 28 fixed to the door mirror stay 20. A support shaft 30 formed in a substantially circular cylindrical shape is disposed integrally with the stand 28 such that it rises vertically from the stand 28.

The retracting mechanism 18 also includes a case member 36. The case member 36 is formed in a substantially box-like shape. The support shaft 30 penetrates the case member 36 from below, whereby the case member 36 is axially supported on the support shaft 30 and is rotatable with respect to the support shaft 36. The case member 36 is fixed to the frame 12 and is always rotatable around the support shaft 30 integrally with the mirror 16 coupled via the frame 12 and the retaining member 14.

A drive motor 42 is fixedly housed inside the case member 36. A worm gear 46 serving as a motor gear is attached to an output shaft 44 of the motor 42. The upper end portion of the worm gear 46 is coupled to the output shaft 44, and the lower end portion of the worm gear 46 is supported on a support shaft 47. A helical gear 48 serving as an intermediate gear meshes with the worm gear 46. A shaft worm 50 serving as an intermediate gear is disposed integrally with the helical gear 48. The helical gear 48 and the shaft worm 50 always rotate integrally.

A gear plate 52 that configures the retracting mechanism 18 and has a substantially circular cylindrical shape is disposed inside the case member 36. The inner peripheral surface of the gear plate 52 corresponds to the outer peripheral surface of the support shaft 30. The support shaft 30 penetrates the gear plate 52, whereby the gear plate 52 is rotatably axially supported. A peripheral tooth 52A is formed on the outer peripheral surface of the gear plate 52. The gear plate 52 meshes with the shaft worm 50 at the peripheral tooth 52A. Thus, the rotational force of the drive motor 42 is transmitted to the gear plate 52 via the worm gear 46, the helical gear 48 and the shaft worm 50.

A clutch mechanism portion 54 is disposed at the periphery of the support shaft 30 above the gear plate 52. The clutch mechanism portion 54 ordinarily deters the rotation of the gear plate 52 with respect to the support shaft 30. Consequently, when the drive motor 42 is activated and the rotational force of the drive motor 42 is transmitted to the gear plate 52, the shaft worm 50 rotates while meshing the periphery of the gear plate 52 as a result of the reaction force of the rotational force. Thus, the case member 36 is pivoted around the support shaft 30 and the mirror 16 pivots in the retracting direction or the erect direction.

Figure 2:
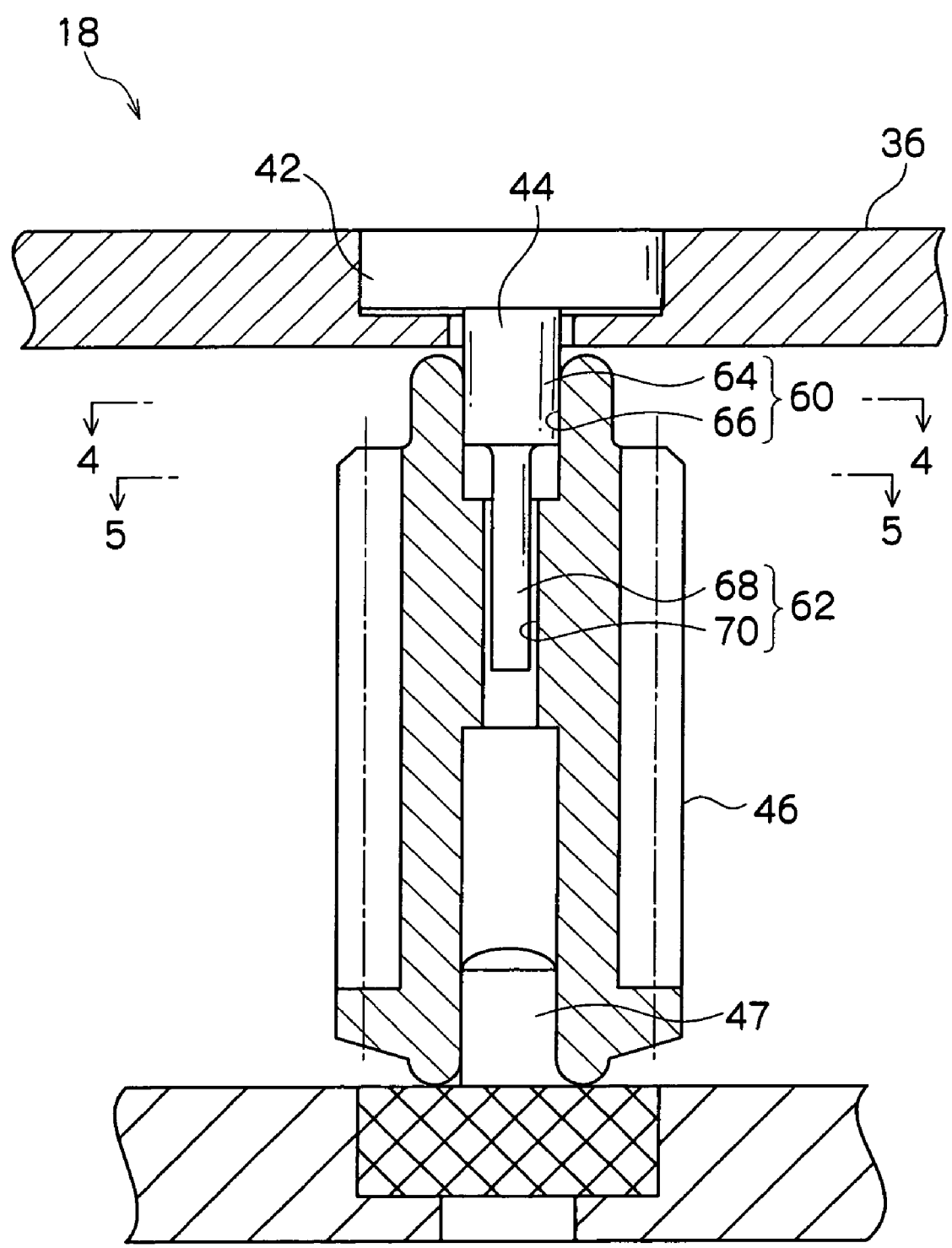
FIG. 2 is a cross-sectional view showing a coupled portion of an output shaft of a drive motor and a worm gear in the retracting mechanism pertaining to the embodiment of the invention.
Figure 3:
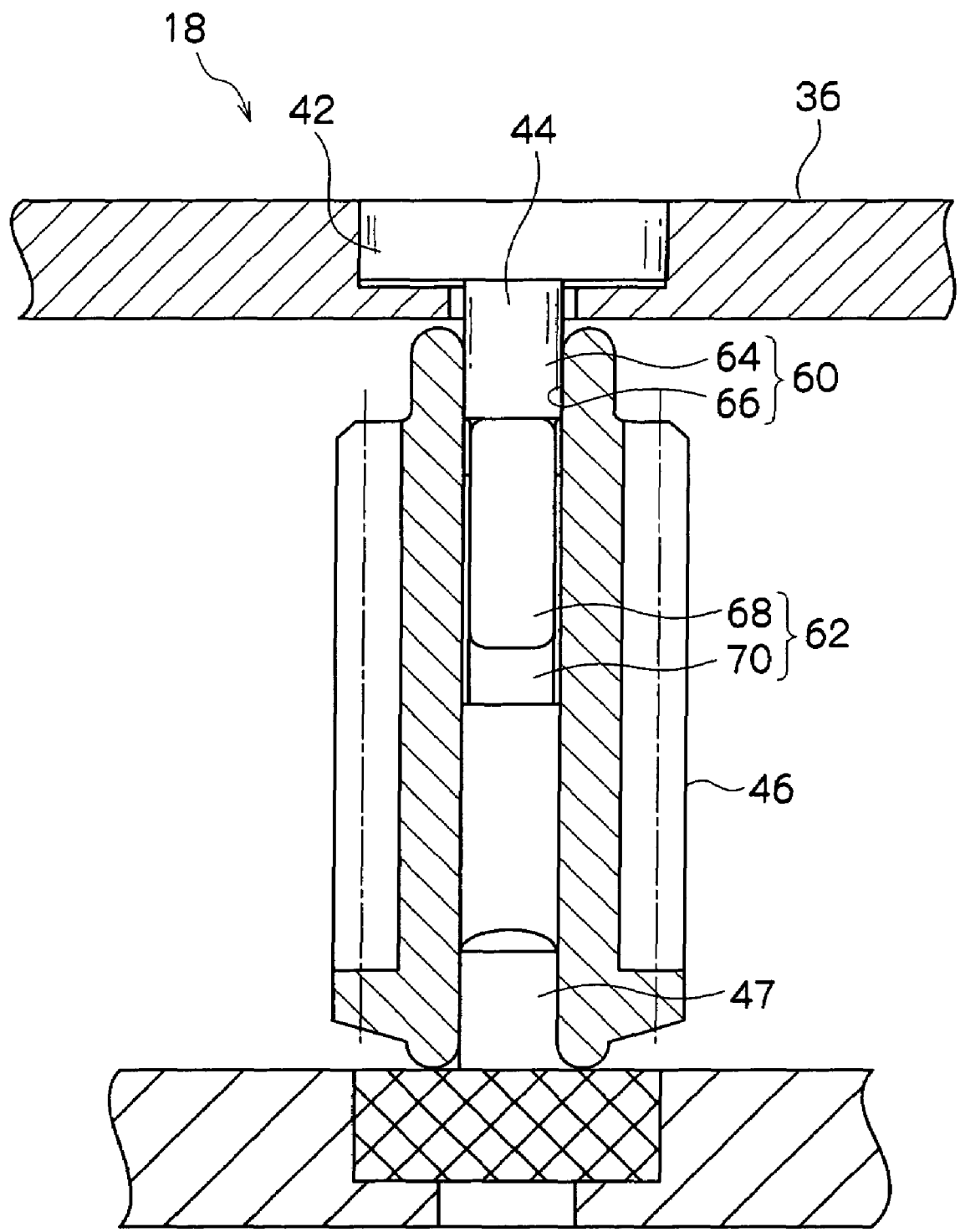
FIG. 3 is a cross-sectional view showing a state where the output shaft of the drive motor and the worm gear shown in FIG. 2 have rotated 90 degrees.

The coupled portion of the output shaft 44 of the drive motor 42 and the worm gear 46 is shown in cross-sectional view in FIG. 2, and a state where the output shaft 44 and the worm gear 46 shown in FIG. 2 have rotated 90 degrees is shown in FIG. 3.

The coupled portion is configured by coupling retaining portions 60 and rotational force transmitting portions 62.

Figure 4:
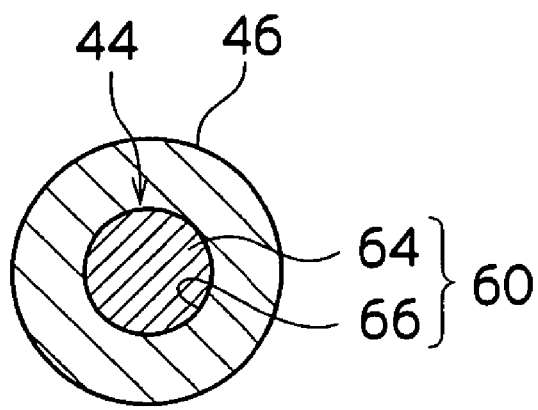
FIG. 4 is a cross-sectional view along line 4-4 of FIG. 2 showing the coupled portion of the output shaft of the drive motor and the worm gear in the retracting mechanism pertaining to the embodiment of the invention.

As shown in FIG. 4, the coupling retaining portions 60 are configured by a circular shaft portion 64 and a circular fitting hole 66. The circular shaft portion 64 is disposed on the output shaft 44 of the drive motor 42 and is formed in a cross-sectionally circular shape. The circular fitting hole 66 is formed in the worm gear 46 in correspondence to the circular shaft portion 64. The coupling retaining portions 60 are fitted together in a press-fitted state and configured to retain the coupled state of the output shaft 44 and the worm gear 46 on the same axial line and to deter the slanting of the worm gear 46.

Figure 5:
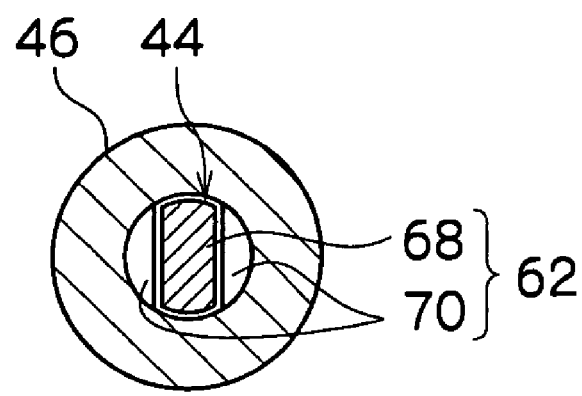
FIG. 5 is a cross-sectional view along line 5-5 of FIG. 2 showing the coupled portion of the output shaft of the drive motor and the worm gear in the retracting mechanism pertaining to the embodiment of the invention.

As shown in FIG. 5, the rotational force transmitting portions 62 are configured by a double D-cut portion 68 and double D-protruding portions 70. The double D-cut portion 68 is formed further towards the end of the output shaft 44 than the circular shaft portion 64. The double D-protruding portions 70 are formed in the worm gear 46 in correspondence to the double D)-cut portion 68. The double D-cut portion 68 is formed as the result of two sites that oppose each other in the circumferential direction being chamfered in planar shapes. The double D-cut portion 68 and the double D-protruding portions 70 oppose each other in a state where a predetermined slight gap is present between them. Namely, the double D-cut portion 68 and the double D-protruding portions 70 transmit only the rotational force of the drive motor 42 (the output shaft 44) to the worm gear 46.

Next, the action of the present embodiment will be described.

In the vehicular outer mirror device 10 to which the retracting mechanism 18 with the above configuration has been applied, ordinarily (in a state where the rotation of the gear plate 52 with respect to the support shaft 30 is prevented by the clutch mechanism portion 54), when the drive motor 42 is driven and the worm gear 46 is rotated, the rotational force is transmitted to the gear plate 52 via the worm gear 46, the helical gear 48 and the shaft worm 50, and the shaft worm 50 rotates (revolves) while meshing with the periphery of the gear plate 52 as a result of the reaction force of the rotational force. Thus, the case member 36 is pivoted around the support shaft 30, and the mirror 16 is pivoted in the retracting direction or the erect direction.

Here, in the retracting mechanism 18 pertaining to the present embodiment, the coupling retaining portions 60 (the circular shaft portion 64 and the circular fitting hole 66) mutually fitted together in a press-fitted state and the rotational force transmitting portions 62 (the double D-cut portion 68 and the double D-protruding portions 70) opposing each other in a state where a predetermined gap is present between them are disposed at the coupled portion of the output shaft 44 of the drive motor 42 and the worm gear 46. The rotational force of the drive motor 42 (the output shaft 44) is transmitted by the rotational force transmitting portions 62, and the coupled state of the output shaft 44 and the worm gear 46 is retained on the same axial line and the slanting of the worm gear 46 is prevented by the coupling retaining portions 60.

Namely, the coupled portion of the output shaft 44 of the drive motor 42 and the worm gear 46 is configured to not just simply transmit the rotational force but also retain the coupled state of the output shaft 44 and the worm gear 46. Moreover, the rotational force transmitting portions 62 function to transmit the rotational force, and the coupling retaining portions 60 function to retain the coupled state of the output shaft 44 and the worm gear 46. In this manner, the respective functions are divided between independent separate sites.

For this reason, the output shaft 44 of the drive motor 42 and the worm gear 46 can be stably coupled together, and even if the reaction force from the gear plate 52, the helical gear 48 and the shaft worm 50 acts on the worm gear 46 and the worm gear 46 tries to slant—i.e., even if the reaction force alternately acts on the D-cut surface and the circumferential surface other than at the D-cut portion as has conventionally been the case—the worm gear 46 does not repeatedly slant (wobble) and not slant (not wobble) at a 90° pitch in accompaniment with the rotation of the output shaft 44 of the drive motor 42. As a result, the occurrence of abnormal noises can be prevented.

In this manner, in the retracting mechanism 18 applied to the vehicular outer mirror device 10 pertaining to the present embodiment, the output shaft 44 of the drive motor 42 and the worm gear 46 can be stably coupled together and the occurrence of abnormal noises can be prevented.

In the present embodiment, a configuration was described where the retracting mechanism 18 was applied to the vehicular outer mirror device 10 formed as a door mirror device, but the retracting mechanism pertaining to the invention may also be applied to a vehicular fender mirror device or the like.

What is claimed is:

1. A retracting mechanism of a vehicular outer mirror device, the retracting mechanism comprising:
   a case member that is pivotably supported on a support shaft of a vehicle body and to which a vehicular outer mirror is coupled;
   a motor disposed in the case member including an output shaft that rotates around an axis of rotation;
   a motor gear that is disposed in the case member, and that has first and second opposing ends including first and second end openings, respectively, said first end opening being coupled to said output shaft of the motor, such that said shaft is rotated by the driving of the motor, and said second end opening being coupled to a gear support shaft;
   a gear plate attached to the vehicle body support shaft such that its rotation with respect to the vehicle body support shaft can be prevented; and
   intermediate gears that are disposed in the case member and mesh with the motor gear and the gear plate to couple the motor gear and the gear plate together, with the intermediate gears rotating while meshing the periphery of the gear plate in a state where the rotation of the gear plate with respect to the vehicle body support shaft is prevented, whereby the outer mirror is pivoted together with the case member around the vehicle body support shaft, wherein a coupled portion is formed between the output shaft of the motor and the opening in the first end of the motor gear that includes coupling retaining portions that are fitted together, and that retain the coupled state of the output shaft of the motor and the motor gear collinear with the axis of rotation, and deter slanting of the motor gear, including a cylindrical surface of said output shaft that slidably interfits with a cylindrical surface of said motor gear, said cylindrical surfaces being rotatably slidable with respect to one another, and rotational force transmitting portions that oppose each other in a state where a predetermined gap is present between the output shaft of the motor and the motor gear, and transmit only the rotational force of the motor to the motor gear, including a first pair of opposing surfaces on said output shaft that opposes a second pair of opposing surfaces on said motor gear, wherein each pair of opposing surfaces is symmetrical with respect to said axis of rotation.

2. The retracting mechanism of a vehicular outer mirror device of claim 1, wherein said cylindrical surfaces of said coupling retaining portions include a cylindrical portion of the output shaft closest to the motor and a cylindrical hole in the motor gear coupled thereto.

3. The retracting mechanism of a vehicular outer mirror device of claim 1, wherein the first and second pairs of opposing surfaces each include two mutually parallel planar surfaces at opposing positions, with their axial centers sandwiched therebetween, in the rotational force transmitting portions.

4. The retracting mechanism of a vehicular outer mirror device of claim 1, wherein the coupling retaining portions and the rotational force transmitting portions are spaced apart from each other, and wherein said coupling retaining portions perform all of a function of deterring slanting of the motor gear, and said rotational force transmitting portions perform all of a function of transmitting all of said rotational force.

5. A retracting mechanism of a vehicular outer mirror device, the retracting mechanism comprising:
   a support shaft fixed to a vehicle body;
   a case member that is pivotably supported on the fixed support shaft and that retains a vehicular outer mirror;
   a motor disposed in the case member having an output shaft that rotates around an axis of rotation;
   a motor gear having first and second opposing ends including first and second end openings, respectively, that is disposed in the case member, said first end opening being coupled to said output shaft of the motor, such that said output shaft is rotated by the driving of the motor, and said second end opening being coupled to a gear support shaft; and
   a rotation transmitting mechanism that transmits the rotation of the motor gear to the fixed support shaft to thereby cause the case member to rotate around the fixed support shaft,
   wherein a portion where the output shaft of the motor and the first end of the motor gear are coupled together, includes
      coupling retaining portions where the output shaft and the motor gear are fitted together and which retain their axial centers collinear with the axis of rotation, including a cylindrical surface of said output shaft that slidably interfits with a cylindrical surface of said motor gear, said cylindrical surfaces being rotatably slidable with respect to one another, and
      rotational force transmitting portions where the output shaft and motor gear include mutually opposing surfaces separated by a gap and where rotational force is transmitted between the output shaft and the motor gear via the opposing surfaces, including a first pair of opposing surfaces on said output shaft that opposes a second pair of opposing surfaces on said motor gear, wherein each pair of opposing surfaces is symmetrical with respect to said axis of rotation.

6. The retracting mechanism of a vehicular outer mirror device of claim 5, wherein the cylindrical surfaces of the coupling retaining portions include a cylindrical portion of said output shaft and a cylindrical hole in the motor gear.

7. The retracting mechanism of a vehicular outer mirror device of claim 6, wherein the cylindrical portion of the output shaft and the cylindrical hole in the motor gear coupled thereto are fitted together in the coupling retaining portions.

8. The retracting mechanism of a vehicular outer mirror device of claim 5, wherein each of the pairs of surfaces of the rotational force transmitting portions include two mutually parallel planar surfaces at opposing positions, with their axial centers sandwiched therebetween, in the rotational force transmitting portions.

9. The retracting mechanism of a vehicular outer mirror device of claim 5, wherein a gear is attached to the fixed support shaft such that the rotation of the gear is prevented, and the rotation transmitting mechanism transmits rotation to the gear attached to the fixed support shaft attached to the fixed support shaft to thereby cause the case member to rotate around the fixed support shaft.

10. A retracting mechanism of a vehicular outer mirror device, the retracting mechanism comprising:
   a support shaft fixed to a vehicle body;
   a case member that is pivotably supported on the fixed support shaft and that retains a vehicular outer mirror;
   a motor disposed in the case member including an output shaft that rotates around an axis of rotation;
   a motor gear having first and second opposing ends including first and second end openings, respectively, that is disposed in the case member, said first end opening being coupled to the output shaft of the motor, such that said shaft is rotated by the driving of the motor, and said second end opening being coupled to a gear support shaft; and
   a rotation transmitting mechanism that transmits the rotation of the motor gear to the fixed support shaft to thereby cause the case member to rotate around the fixed support shaft,
   wherein a portion where the output shaft of the motor and the first end of the motor gear are coupled together, includes
      coupling retaining portions where the output shaft and the motor gear are fitted together and which retain their axial centers collinear with the axis of rotation, including a cylindrical surface of said output shaft that slidably interfits with a cylindrical surface of said motor gear, said cylindrical surfaces being rotatably slidable with respect to one another, and rotational force transmitting portions where the output shaft and the motor gear include planar surfaces that oppose each other in a state where they include a predetermined gap and where rotational force is transmitted between the output shaft and the motor gear via the planar surfaces, including a first pair of mutually parallel opposing surfaces on said output shaft that opposes a second pair of mutually parallel opposing surfaces on said motor gear, wherein each pair of opposing surfaces is symmetrical with respect to said axis of rotation.

11. The retracting mechanism of a vehicular outer mirror device of claim 10, wherein the cylindrical surfaces of the coupling retaining portions include a cylindrical portion of said output shaft and a cylindrical hole in the motor gear.

12. The retracting mechanism of a vehicular outer mirror device of claim 11 wherein the cylindrical portion of the output shaft and the cylindrical hole in the motor gear coupled thereto are fitted together in the coupling retaining portions.

13. The retracting mechanism of a vehicular outer mirror device of claim 10, wherein the mutually parallel planar surfaces at opposing positions of each pair of surfaces is arranged, with their axial centers sandwiched therebetween, in the rotational force transmitting portions.

14. The retracting mechanism of a vehicular outer mirror device of claim 10, wherein a gear is attached to the fixed support shaft such that the rotation of the gear attached to the fixed support shaft is prevented, and the rotation transmitting mechanism transmits rotation to the gear attached to the fixed support shaft to thereby cause the case member to rotate around the fixed support shaft.

* * * * *